US012705684B2

(12) United States Patent
Ghosh

(10) Patent No.: US 12,705,684 B2
(45) Date of Patent: Aug. 11, 2026

(54) TIME SLICING

(71) Applicant: Imagination Technologies Limited, Kings Langley (GB)

(72) Inventor: Subhasish Ghosh, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 202 days.

(21) Appl. No.: 18/782,272

(22) Filed: Jul. 24, 2024

(65) Prior Publication Data

US 2025/0054095 A1 Feb. 13, 2025

(30) Foreign Application Priority Data

Jul. 24, 2023 (GB) ..................................... 2311307

(51) Int. Cl.
*G06T 1/20* (2006.01)

(52) U.S. Cl.
CPC ..................................... *G06T 1/20* (2013.01)

(58) Field of Classification Search
CPC ....................................................... G06T 1/20
See application file for complete search history.

(56) References Cited

U.S. PATENT DOCUMENTS 8,341,624 B1 12/2012 Hobbs
2014/0176583 A1* 6/2014 Abiezzi ................ G06F 9/5044 345/522
2015/0371355 A1* 12/2015 Chen ...................... G09G 5/363 345/505
2016/0358305 A1* 12/2016 Banerjee ................... G06T 1/20
2018/0293776 A1* 10/2018 Ray ..................... G06F 12/0842
2019/0287205 A1* 9/2019 Ramadoss ............. G06F 9/4881
2023/0385093 A1* 11/2023 Jain ..................... G06F 9/45558

FOREIGN PATENT DOCUMENTS

EP 4254185 A1 10/2023

* cited by examiner

*Primary Examiner* — King Y Poon
*Assistant Examiner* — David Van Nguyen
(74) *Attorney, Agent, or Firm* — Potomac Law Group, PLLC; Vincent M DeLuca

(57) ABSTRACT

A method of scheduling a plurality of active GPU drivers in a GPU includes, for one or more of the plurality of active GPU drivers, allocating a portion of a scheduling interval to the active GPU driver and selecting an active GPU driver for execution according to a priority-based scheduling algorithm. In response to an active GPU driver executing within its allocated portion, the priority level of the active GPU driver is increased, in response to the active GPU driver completing its workload within its allocated portion the priority level of the active GPU driver is reset and in response to the active GPU driver executing for its whole allocated portion, the priority level of the active GPU driver is reduced. The priority levels of each active GPU driver are reset to their initial priority levels at the start of each scheduling interval.

20 Claims, 8 Drawing Sheets

TK
D0 CONTINUOUS RUNTIME
CSW
D1
TS CSW
TK
D2
TS
D0
D1
CSW
D0
TK
D0
TS
D1
TS CSW
D0
202
204
206
208
210
212
214
216
218
220
222
224
226
D0 -
EXECUTION
D0 TS TIMER =
ALLOCATED -
USED
INTERVAL TIMER DURATION (I)
INTERVAL TIMER DURATION (II)
INTERVAL TIMER
DURATION (III)
PRIORITY
TIME

PRIORITY
P0
P1
P2
301
302
303

TIME SLICING

CROSS-REFERENCE TO RELATED APPLICATIONS AND CLAIM OF PRIORITY

This application claims foreign priority under 35 U.S.C. 119 from United Kingdom patent application No. 2311307.9 filed on 24 Jul. 2023, the contents of which are incorporated by reference herein in their entirety.

TECHNICAL FIELD

The invention relates to scheduling of workloads in a graphics processing unit (GPU).

BACKGROUND

Within a GPU there are many different types of workloads to execute and a scheduler may use the workload type (e.g. compute, 2D, 3D, etc.), or the identity of the hardware unit that fed the particular data into the particular GPU pipeline (which may be referred to as a 'master unit' and may be a proxy for the workload type) in a scheduling algorithm to determine which workload to schedule at any time. In a virtualised system, there will be many different GPU drivers, each driver corresponding to a different virtual operating system (OS), and at any point in time there may be workloads associated with several different GPU drivers awaiting execution within the GPU. Different GPU drivers may be assigned different priority levels and these priority levels may be used in a scheduling algorithm to determine which workload to schedule at any time.

The embodiments described below are provided by way of example only and are not limiting of implementations which solve any or all of the disadvantages of known scheduling algorithms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of scheduling a plurality of active GPU drivers in a GPU is described. The method comprises, for one or more of the plurality of active GPU drivers, allocating a portion of a scheduling interval to the active GPU driver and selecting an active GPU driver for execution according to a priority-based scheduling algorithm. In response to an active GPU driver executing within its allocated portion, the priority level of the active GPU driver is increased, in response to the active GPU driver completing its workload within its allocated portion the priority level of the active GPU driver is reset and in response to the active GPU driver executing for its whole allocated portion, the priority level of the active GPU driver is reduced. The priority levels of each active GPU driver are reset to their initial priority levels at the start of each scheduling interval.

A first aspect provides a method of scheduling a plurality of active GPU drivers in a GPU, each of the active GPU drivers having an initial priority level and the method comprising: for one or more of the plurality of active GPU drivers, allocating a portion of a scheduling interval to the active GPU driver; selecting an active GPU driver for execution according to a priority-based scheduling algorithm; in response to an active GPU driver executing within its allocated portion, increasing the priority level of the active GPU driver; in response to the active GPU driver completing its workload within its allocated portion, resetting the priority level of the active GPU driver; in response to the active GPU driver executing for its whole allocated portion, reducing the priority level of the active GPU driver; and resetting the priority levels of each active GPU driver to their initial priority levels at the start of each scheduling interval.

Further aspects provide a GPU configured to perform the method of the first aspect or any other method described herein and a GPU comprising a microprocessor configured to perform the method of the first aspect or any other method described herein.

The GPU (which may be a GPU with an integrated workload scheduler) may be embodied in hardware on an integrated circuit. There may be provided a method of manufacturing, at an integrated circuit manufacturing system, a GPU. There may be provided an integrated circuit definition dataset that, when processed in an integrated circuit manufacturing system, configures the system to manufacture a GPU. There may be provided a non-transitory computer readable storage medium having stored thereon a computer readable description of a GPU that, when processed in an integrated circuit manufacturing system, causes the integrated circuit manufacturing system to manufacture an integrated circuit embodying a GPU.

There may be provided an integrated circuit manufacturing system comprising: a non-transitory computer readable storage medium having stored thereon a computer readable description of the GPU; a layout processing system configured to process the computer readable description so as to generate a circuit layout description of an integrated circuit embodying the GPU; and an integrated circuit generation system configured to manufacture the GPU according to the circuit layout description.

There may be provided a method of manufacturing, using an integrated circuit manufacturing system, a GPU configured to perform the method of the first aspect or any other method described herein, the method comprising: processing, using a layout processing system, a computer readable description of the GPU so as to generate a circuit layout description of an integrated circuit embodying the GPU; and manufacturing, using an integrated circuit generation system, the GPU according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
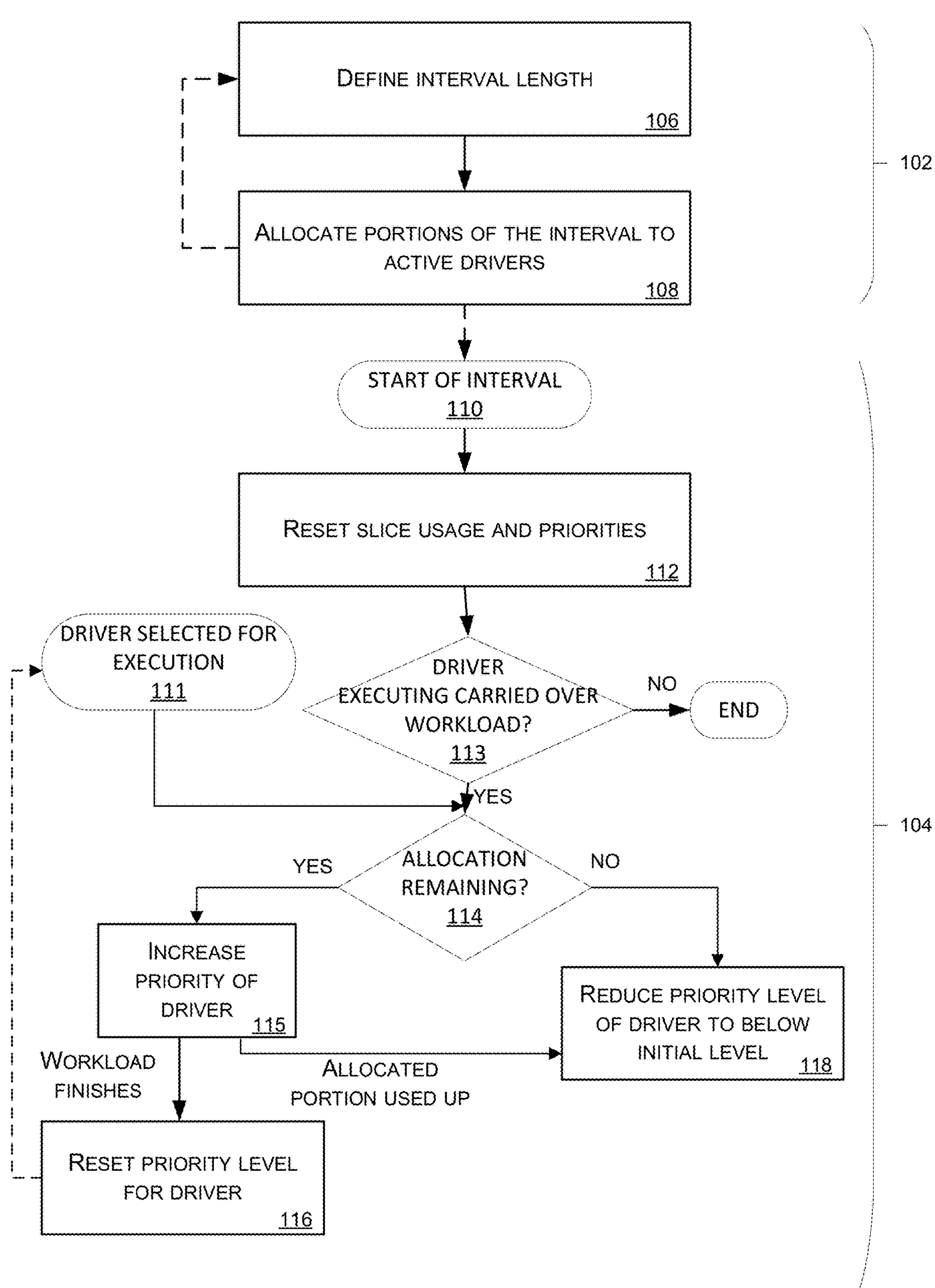
FIG. 1 shows a flow diagram of a first example scheduling method.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, in a virtualised system, there will be many different GPU drivers, with each driver corresponding to a different virtual operating system, and at any point in time there may be workloads associated with several different GPU drivers awaiting execution within the GPU. Different GPU drivers may be assigned different priority levels (e.g. as assigned by a user) and these priority levels may be used in a scheduling algorithm to determine which workload to schedule at any time (e.g. by scheduling higher priority drivers over lower priority drivers). A scheduling algorithm that uses priority levels to determine which workload to schedule may be referred to as a priority-based scheduling algorithm. Such an algorithm may use only priority or may use additional parameters, in addition to the priority levels, to determine which workload to schedule. However, problems may occur where the workload of a high priority driver is scheduled in a way that starves a lower priority driver of execution time to such an extent that it impacts performance (e.g. it may visibly impact performance by causing a graphical user interface (GUI) application to appear frozen or by significantly reducing the frame rate, such as to below 60 fps). For example, if a high priority driver with a compute workload (e.g. an AI or data task) is scheduled, it may indefinitely starve a lower priority driver executing a graphics workload (e.g. geometry processing, fragment processing, or 2D graphics workloads), i.e. the graphics workload may be blocked from execution until the compute workload completes which may take many seconds. The blocking of the graphics workload may result in the frame rate of the GUI application being temporarily reduced to zero, and hence the GUI application will appear frozen. Such problems are not limited to compute tasks causing graphics tasks to be starved and in other examples, a higher priority driver with a first graphics workload may starve a lower priority driver with a second graphics workload, such that the frame rate of the second graphics workload is reduced (e.g. reduced to a point that is visible to a user, such as to below 60 fps) or a higher priority driver with a first compute workload may starve a lower priority driver with a second compute workload.

To address this problem, workloads of different types (i.e. workloads from different master units within a GPU) may be permitted to overlap (i.e. run in parallel); however as execution of the overlapping workloads may rely upon the use of shared resources (e.g. shared registers, temporary registers, etc.), a workload can still end up being starved of execution time.

Described herein is a scheduling method that provides a guaranteed, configurable, minimum execution time for an active driver assuming that the active driver has sufficient workload to execute and that the workload is available for execution at the point that the active driver could be scheduled for execution. An active driver is a driver that is powered up and has an established connection with the scheduler. Depending upon the configuration, a guaranteed minimum execution time may be provided for each active driver or for only some of the active drivers (i.e. for a proper subset of the active drivers). The guaranteed minimum execution time may be different for different drivers and may vary over time, e.g. such that initially a first driver has a larger guaranteed minimum execution time than a second driver and subsequently, the second driver has a larger guaranteed minimum execution time than the first driver. The minimum execution time for a driver may be configurable by a user or may be defined by the system (e.g. by the scheduler) and this may differ between drivers (e.g. with some drivers having user-defined minimum execution times and other drivers having system-defined minimum execution times). Where the minimum execution time is user-defined, this may be in terms on an absolute time (e.g. in terms of milliseconds) or a proportion of the available execution time (e.g. in terms of a percentage or fraction). Where the minimum execution time is system-defined, it may be dynamic (i.e. it is defined in real-time and may change over time in response to detected system conditions). Where the minimum execution time is user-defined, it may be updated by the user periodically and hence also may not remain the same.

As described in more detail below, the scheduling method described herein uses two types of timers which may be referred to as an interval timer and a slice timer. The method uses a single interval timer and one or more slice timers. The method relies upon dividing the GPU execution time into intervals, as defined by the interval timer. An interval ends, and the next interval starts, when the interval timer expires. The duration of the interval timer may be a user-configurable parameter (e.g. stored in a data structure) and/or may vary over time (i.e. it may be a dynamically defined parameter). The duration of the interval timer (and hence the length of an interval) may, for example, be 100 ms or 1000 ms. Within each interval, time slices are allocated to one or more active drivers and in some examples to all active drivers. These allocated time slices correspond to the guaranteed minimum execution time for the corresponding driver within the particular interval and as described above the length of a time slice may be user-configured or defined dynamically by the system. As described above, the allocated time slices may be defined in absolute terms or as a proportion of the interval length. By using a proportional allocation (e.g. 5% of the interval), rather than a fixed allocation (e.g. 10 ms), the allocated time slice is automatically scaled if the length of an interval is changed and so this is more efficient than using fixed length allocations. The sum of the allocated time slices cannot exceed the total interval length and so the maximum time slice that can be allocated corresponds to the entire interval length (i.e. 100% where time slices are allocated as a percentage of the interval).

Within an interval, as an active driver executes, it uses up its time slice and hence the slice timer for an active driver indicates the remaining portion of the time slice allocated to that driver based on the cumulative execution time for the driver in the interval (e.g. slice timer=allocated time slice−total execution time in the interval). The time slice for a driver does not need to be used in one contiguous block, for example, where the driver finishes its current workload before it uses up its time slice, it may stop execution and retain the remaining part of the time slice for executing any future workload within the same time interval. The slice timer for the driver expires when the time that the driver has been executing within the interval equals the allocated time slice (i.e. allocated time slice=total execution time in the interval) and this situation may be described as the driver's time slice being fully used up. As described below, the expiry of a slice timer does not prevent the driver from continuing its execution (i.e. the expiry of a slice time does not trigger the driver to stop executing immediately). Instead, once a driver's time slice has been used up, its priority level is reduced so that it is more likely to be context switched out so that another driver can start executing (e.g. so that a driver with a slice timer that has not expired can start executing). Where more than one driver can be executing in parallel, there may be one slice timer for each executing driver or there may be a single slice timer that is used for all active drivers when they execute (e.g. such that when the timer expires for one executing driver, it is restarted for an executing driver which does have a remaining allocation). There may also be a slice timer for each other active driver that was allocated a time slice but is not currently executing or alternatively an active driver's total execution time within the interval may be stored and used to update a slice timer when it starts executing.

The two types of timers are used in the method to trigger changes to priority levels of the active drivers. The expiry of the interval timer triggers the resetting of priority levels to their initial values and the expiry of the slice timer for an executing active driver triggers a reduction in the priority level of the particular executing active driver. By manipulating priority levels in this way, existing scheduling algorithms which use the priority of drivers can still be used (e.g. without requiring any modification) whilst providing a guaranteed, configurable, minimum execution time for an active driver (and hence preventing starvation of the workload for a particular active driver) and this may reduce context switching which is particularly costly (e.g. in terms of latency and efficiency) on a GPU because of the depths of the pipelines (e.g. compared to CPU pipelines) that are drained upon a context switch. The use of the two types of timers also provides flexibility in terms of configuration both of the allocations for different active drivers and the length of an interval both on a per-interval level and on a longer timescale (e.g. over many interval lengths).

A first example of the scheduling method is shown in FIG. 1. The method comprises a set-up phase 102 and an execution phase 104. As shown in FIG. 1, in the set-up phase 102, the length of an interval is defined (block 106) and a portion of the interval is allocated an active driver (block 108). More than one portion may be allocated (in block 108) with each portion being allocated to a different active driver and where more than one portion is allocated, the allocated portions may be of the same or different sizes. Some or all of the active drivers may each be allocated a portion of the interval (in block 108) and the total allocation cannot exceed 100% of the interval (irrespective of whether portions are defined in absolute or percentage/fractional terms). Consequently the maximum possible allocation is 100% of the interval in which case, this portion is allocated to a single active driver. Some active drivers may not be allocated any portion of the interval. As described below, if an active driver is not allocated a portion of the interval, it does not necessarily prevent the active driver from being scheduled for execution within the interval; however, the driver does not have any guaranteed minimum execution time within the interval and will only execute when there are no workloads scheduled from any other driver that does have an allocation.

The set-up phase 102 is initially performed before the execution phase 104 (as shown in FIG. 1) but once execution has started, the set-up phase 102 may be subsequently performed in parallel with the execution phase 104 in order to update the interval length and/or allocations for a subsequent interval. Where the set-up phase 102 is not repeated, the interval length and allocations remain unchanged for subsequent intervals. Interval length and/or portion allocations may be updated in the set-up phase mid-interval but any changes made during an interval do not impact the current interval and instead come into effect at the start of the next interval. As described above, where the allocations are defined as a proportion of the interval length, the allocations are automatically updated (i.e. scaled) in response to a change in the interval length which improves efficiency compared to fixed allocations.

The execution phase 104 starts at the start of an interval (block 110) and at this point, the slice usage (e.g. the record of the cumulative execution time for each driver in the interval) and priorities of each active driver are reset (block 112). For the first interval in the execution phase 104, this reset operation (in block 112) does not change anything since the slice usage will already be at zero and the priorities of each active driver will be at their unmodified, input (and hence already reset) levels. For an active driver that is already executing a workload that has been carried over from the immediately preceding interval ('Yes' in block 113), the priority of the executing active driver is increased if the driver is executing within its allocated portion ('Yes' in block 114 followed by block 115). In other words, if the slice timer for the executing active driver has not expired, the priority of the executing active driver is increased (in block 115).

As shown in FIG. 1, in the event that at the start of an interval (block 110) there is no driver that is executing workload carried over from an immediately preceding interval ('No' in block 113), the method takes no further action (as indicated by 'End') until a driver is subsequently selected for execution and the method restarts (from block 111).

If the executing active driver finishes its workload before it has used up its allocated portion (i.e. before its slice timer has expired) and the active driver has no further workload to execute, then the driver stops executing and its priority level is reset to its original, input level (block 116). If, however, the executing active driver executes for a cumulative period of time within the interval that equals its allocated portion, such that its slice timer expires (and the driver may be described as having used up its allocated portion), the priority level of the executing active driver is reduced to a level that is below its original, input level (block 118). This does not directly cause the executing active driver to stop execution; however, it increases the likelihood that the driver is context switched out so that a higher priority active driver can execute instead.

If the executing active driver does not have an allocation, then the driver will not be executing within its allocated portion and hence its priority will not be increased (in block 115). Instead, the priority level of the driver will be reduced to a level that is below its original, input level (in block 118). As noted above, this does not directly cause the executing active driver to stop execution; however, it increases the likelihood that the driver is context switched out so that a higher priority active driver can execute instead.

If a different active driver starts executing within the interval (e.g. as a consequence of a context switch from a lower priority active driver to a higher priority active driver or an executing active driver completing its current workload) then the method proceeds from block 111 for that newly executing active driver. If the driver is executing within its allocated portion ('Yes' in block 114), its priority is increased (in block 115) and once the allocated portion is used up, its priority level is reduced (in block 118).

If an active driver stops execution within the interval as a consequence of completion of its current workload, it may subsequently be rescheduled (e.g. based on the scheduling algorithm used) and selected for execution (in block 111) and start executing again if it has a new workload to execute. At this point, if the driver has allocation remaining ('Yes' in block 114) its priority level is increased again (in block 115), as indicated by the dotted arrow from block 116 to block 111.

If an active driver stops execution within the interval as a consequence of being context switched out after it has used up its allocated portion, it may still subsequently be rescheduled (e.g. based on the scheduling algorithm used) and start executing again, e.g. if there is no other active driver with workload to execute that has a higher priority. At this point, its priority level remains at the reduced level (from block 118) until it is reset at the start of the next interval.

If the interval timer expires, and hence the interval ends, before the executing active driver has used up its allocated portion (e.g. because the executing active driver did not have workload ready to execute sufficiently early within the interval to use the entire allocated portion), then the driver does not stop executing but its priority level is first reset to its original, input level (in block 112) and is then increased (in block 115) if the driver has an allocation in the new interval ('Yes' in block 114). The executing active driver can then continue to execute until either it runs out of workload or it uses up its allocation in the new interval (causing its priority level to be reduced in block 118) and is context switched out in favour of a higher priority active driver. By not stopping execution of a driver as soon as its allocated portion is used up, the number of context switches is reduced and the efficiency of the GPU is improved.

As a consequence of the adjustment of the priority levels as shown in FIG. 1 and described above, if all allocated portions have been used up, or any remaining portions relate to active drivers without any workload to execute, any active drivers that were not allocated a portion (in block 108) may be selected for execution using a priority-based scheduling algorithm (e.g. a scheduling algorithm that selects drivers for execution based on their relative priorities and may, for example, select a higher priority driver with a workload for execution in preference over a lower priority driver). Such active drivers will remain at their initial, unmodified, priority level until they commence execution and so will be at a higher priority level than those active drivers that have used up their allocated portion and have had their priority reduced (in block 118). As soon as a driver starts executing outside, or without, an allocation in the particular time interval ('No' in block 114), then its priority is reduced to below its initial level (in block 118).

The input, unmodified, priority levels of the active drivers may all fall within a range of values which may be referred to as the normal range. When the priority of an active driver is increased (in block 115), the priority may be increased from a value within the normal range to a value in a higher range which may be referred to as the ceiling range. The higher range may be broader or narrower or the same breadth as the normal range (i.e. in terms of the range of priority values falling within the range).

In some examples, the higher range may comprise a single, maximum, priority value in which case when the priority of an active driver is increased (in block 115), the priority may be increased from its input value within the normal range to that single, ceiling, priority value. In such an example, however, it is necessary to store the input priority value for the active driver in order that it is possible to subsequently reset the priority (in block 112 or 116).

In other examples, however, when the priority of an active driver is increased (in block 115), the priority may be increased by a first predefined amount ($A_{ceiling}$) from its input value ($P_{initial}$) within the normal range to a value ($P_{ceiling}$) in the higher range (e.g. $P_{ceiling}=P_{initial}+A_{ceiling}$). In such examples, the higher range may have the same breadth as the normal range. This avoids the need to store the input priority value because to reset the priority (in block 116) the priority value is reduced by the first predefined amount. In an example implementation, the priority may be increased/decreased by the first predefined amount by setting/unsetting a predefined bit (e.g. the $30^{th}$ bit) in the priority value that is reserved for this purpose, i.e. it is not used to set priority values within the normal range (e.g. such that the normal range of values can be set using no more than the first 29 bits in the priority value).

In a similar manner, when the priority of an active driver is reduced to below its initial value (in block 118), the priority may be reduced from a value within the ceiling range to a value in a range that is lower than the normal range which may be referred to as the floor range. The lower, floor, range may be broader or narrower or the same breadth as the normal range and/or the higher range (i.e. in terms of the range of priority values falling within the range).

In some examples, the floor range may comprise a single, minimum, priority value in which case when the priority of an active driver is reduced (in block 118), the priority may be decreased from its input value within the normal range to that single, floor, priority value. In such an example, however, it is necessary to store the input priority value for the active driver in order that it is possible to subsequently reset the priority (in block 112).

In other examples, however, when the priority of an active driver is reduced (in block 118), the priority may be decreased by a second predefined amount ($A_{floor}$) that is larger than the first predefined amount (e.g. $P_{floor}=P_{ceiling}-A_{floor}$, where $A_{floor}>A_{ceiling}$). This ensures that the resultant priority value ($P_{floor}$) is lower than its input value and falls within the floor range. In such examples, the lower, floor, range may have the same breadth as both the normal range and the ceiling range. This avoids the need to store the input priority value because to reset the priority (in block 112) the priority value is increased by the difference between the first and second predefined amounts (e.g. $P_{initial}=P_{floor}+A_{floor}-A_{ceiling}$). In an example implementation, where the priority values are represented using two's complement, the priority may be decreased by the second predefined amount by setting the most-significant bit (e.g. the $31^{st}$ bit in a 31-bit priority value) in the priority value (in addition to the next most-significant bit that was set to increase the priority value), where this most-significant bit (MSB) is also not used to set priority values within the normal range (i.e. it is reserved for this purpose) and setting the MSB turns the priority value negative. The priority may then be reset by unsetting both the reserved bits, i.e. the MSB and the next most-significant bit (e.g. the $30^{th}$ and $31^{st}$ bits in a 31-bit priority value).

As described above, where the priority levels are adjusted up and down by predefined amounts, this avoids the need to store the input priority value for an active driver. Additionally, it preserves the relative priorities of the active drivers, which is particularly useful for active drivers that have used up their allocated portions and have priority values in in the floor range. This has the effect that where there are no active drivers with workloads to execute with priority levels in the ceiling or normal ranges, the active drivers that are in the floor range can be scheduled, using a priority-based scheduling algorithm, with the same relative priority compared to each other as their input priorities.

The resetting of the priorities at the start of each interval (in block 112) enables each interval to start afresh whilst reducing context switches by avoiding the need to context switch out the executing driver when the interval timer expires. Context switching will only happen at the start of an interval if the currently executing driver has no allocation in the new interval and in which case, the driver will be context switched out in favour of a driver that does have an allocation in the new interval.

Figures 2, 3:
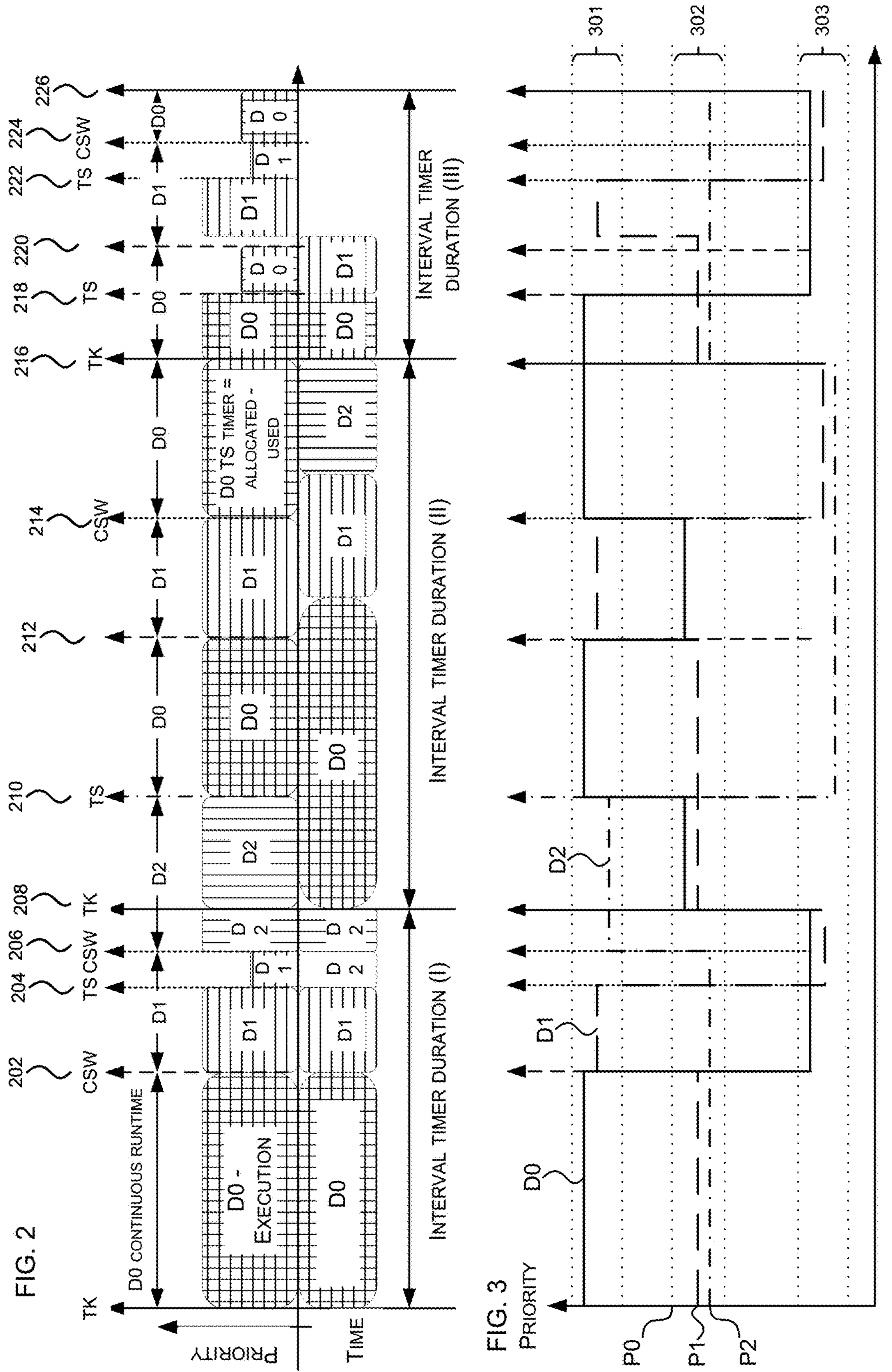
FIG. 2 is a schematic diagram showing an example scenario that uses the method of FIG. 1.
FIG. 3 is a priority graph for the example scenario shown in FIG. 2.

The method of FIG. 1 can be described with reference to the example scenario shown in FIGS. 2 and 3. FIG. 2 is a schematic diagram that shows both the initial allocation of portions of each interval to active drivers (in the lower row of blocks) and the resultant execution schedule (in the upper row of blocks). In FIG. 2, the lower row of blocks shows the allocation of portions to each driver but does not imply any particular order in which they must be executed. Events are indicated by the vertical arrows. In the example shown, there are three active drivers denoted D0, D1 and D2. Three time intervals are shown, labelled I, II and III with the timeline progressing from left to right (i.e. such that the first interval, I, is on the left and the third interval, III, is on the right). In the upper row of blocks, the height of the block indicates the priority value of the corresponding executing driver at that time; however the priorities of the active drivers are more clearly shown in FIG. 3. The priority levels of the executing drivers shown in FIG. 2 are either the raised, ceiling, priority level for the driver (as increased in block 115) or the reduced, floor, priority level (as decreased in block 118) for the driver. In FIG. 2, the ceiling level is shown as the same for all drivers; however, as described above, there may be a range of priority values within the ceiling range and within any of the ranges. FIG. 3 shows a more detailed graph of the priority levels of each of the three active drivers over the three intervals shown in FIG. 2, with the timelines of the FIG. 2 and FIG. 3 shown in alignment. The three ranges of priority levels, the ceiling range 301, normal range 302 and floor range 303 are marked in FIG. 3 and in this example, D0 has a normal priority ($P_0$) which is higher than that of D1 ($P_1$) and D1 has a normal priority ($P_1$) that is higher than that of D2 ($P_2$).

In the first interval, I, in FIG. 2, each of the three active drivers, D0, D1 and D2 is allocated a portion. In this example, the portion allocated to the first active driver, D0, is user-defined at 60% and the remaining 40% is dynamically allocated between the other two active drivers, D1 and D2 (i.e. 20% allocated to each). This is shown in the lower row of blocks within the first interval although as noted above, the order of the blocks in the lower row does not indicate any kind of preferred order for the execution of the three drivers. In the first interval, D0 executes until it has used up its allocated portion of the time interval (and hence its slice timer expires). As shown in FIG. 3, when D0 is executing, its priority is raised to within the ceiling range 301 (in block 115) and then once its slice timer expires, its priority is reduced to within the floor range 303 (in block 118) and as a result D1 (which at that point is at its initial priority level within the normal range 302) has a higher priority than D0. Consequently, D1 is selected for execution, a context switch occurs (arrow 202) and D1 starts executing. Once D1 is executing, its priority level is raised to within the ceiling range 301 (in block 115). When D1 has used up its allocated portion of the time interval (and hence its slicer timer expires) its priority level is reduced to within the floor range 302 (arrow 204). There is not a context switch at this point in time because there is no workload for D2 to execute and so D1, which does have further workload to execute, continues execution until there is workload for D2 to execute at which point (arrow 206) a context switch occurs and D2 starts executing. Whilst not shown in FIG. 2, if D0 had workload to execute at the point that D1 has used up its allocated portion (arrow 204, or at any point between arrows 204 and 206), then D1 would have been context switched out in favour of D0 as the reduced priority of D0 (within the floor range) is above the reduced priority of D1 (also within the floor range). At the point that the interval timer expires (arrow 208), D2 is executing and has not used its entire allocation within the first interval as a consequence of the unavailability of workload to execute at the point when D1's slice timer expired.

When the interval timer expires (arrow 208), there is no immediate context switch. Instead, the driver that is currently executing (D2) continues execution and the slice usage, allocations and priorities are reset (in block 112). In the example of FIG. 2, the allocations remain unchanged in the second interval, II, (e.g. 60/20/20) but the interval length has been increased. As D2 is executing and has an allocation in the second interval, its priority is increased to the ceiling range 301 and it continues to execute until its slice timer expires (arrow 210). A context switch then occurs and D0 starts executing. The priority of D2 is reduced to the floor range 303 (because its allocation has been used up) and the priority of D0 is increased to the ceiling range 301 (because its allocation has not been used up). In this example, the workload of D0 is completed (arrow 212) before its allocation is used up. D0 stops execution upon completion of its workload and D1 starts executing. The priority of D0 is reset to its initial value in the normal range 302 (in block 116, because its allocation has not been used up but it has no workload to execute) and the priority of D1 is increased to the ceiling range 301 (because its allocation has not been used up). By the time the slice timer for D1 expires (arrow 214), another workload for D0 is available and so D1 is context switched out and D0 restarts its execution. The priority of D1 is reduced to the floor range 303 (because its allocation has been used up) and the priority of D0 is increased to the ceiling range 301 (because its allocation has not been used up). At the point that the interval timer expires at the end of the second interval (arrow 216), D0 is executing and has just used its allocation within the second interval.

When the interval timer expires at the end of the second interval (arrow 216), there is no immediate context switch. Instead, the driver that is currently executing (D0) continues execution and the slice usage, allocations and priorities are reset (in block 112). In the example of FIG. 2, the allocations change in the third interval, III, with two drivers, D0 and D1, being user allocated and the full 100% is not allocated. For the third interval, the interval length has also been decreased. As D0 is executing and has an allocation in the third interval, its priority is increased to the ceiling range 301 and it continues to execute until its slice timer expires (arrow 218). When the slice timer for D0 expires, its priority is reduced to within the floor range 303 (in block 118) and it continues to execute until it has no further workload to execute (arrow 220). At this point, no other active driver has any workload to execute and so there is a short period in which no drivers are executing. Once D1 has workload to execute, it starts executing and its priority level is increased to within the ceiling range 301 (in block 115). Once D1 has used up its allocated portion of the time interval (and hence its slice timer expires) its priority level is reduced to within the floor range 303 (arrow 220). There is not a context switch at this point in time because there is no workload for D0 or D2 to execute and so D1, which does have further workload to execute, continues execution until there is workload for D0 to execute. As the priority level of D0 within the floor range 303 is higher than the priority level of D1 within the floor range 303, once there is workload for D0 a context switch occurs (arrow 222) and D0 starts executing. Whilst D2 is not shown as executing in the third interval, III, in FIG. 2, if D2 had a workload to execute and was selected for execution, its priority level would be immediately reduced to within the floor range 303 (in block 118) as it is not executing within an allocation (because D2 has no allocation in the third interval).

As shown in the third interval, III, in FIG. 2, drivers that have priority levels in the floor range 303 execute in a manner that is unrestricted by time slicing until the interval timer expires (arrow 224) at which point their allocations, usage and priorities are reset (in block 112).

As shown in FIG. 2, the length of the intervals (and hence the duration of the interval timers) may vary over time. Shorter intervals generally result in smaller allocations to the different active drivers and more context switching compared to longer intervals. As described above, context switching in a GPU is costly (e.g. in terms of latency and efficiency) and so the interval length may be increased (in block 106) in response to the number of context switches in a previous interval, or group of previous intervals, exceeding a predefined threshold. Longer intervals, however, may result in larger allocations to the different active drivers and may result in drivers with shorter workloads being delayed in their execution to towards the end of an interval by other drivers with longer workloads. Consequently, in addition to (or instead of) increasing the interval length (in block 106) based on the number or frequency of context switches, the interval length may be reduced (in block 106) in response to a detected reduction in the frame rate for a particular driver. By enabling interval length to be varied dynamically in this way (and/or in response to other detected conditions within the GPU or wider computing system), without requiring changes to the underlying scheduling algorithm, the interval length can be optimised for particular combination of workloads being executed at any time.

As described above, the interval timer may be a user-configurable parameter or a system-defined parameter. Similarly, for any active driver, the portion of an interval allocated to that driver may be user-defined or system-defined. Data identifying the portions allocated to each active driver and the interval duration may be stored in a local data structure (e.g. within the GPU), which may be referred to as the time slice data structure, and updated when the interval timer is triggered (i.e. when the interval timer expires). This updating enables any changes that have been made during the preceding interval (i.e. the interval that has just ended) to be implemented for the next interval. Drivers which are not active are not allocated a portion and some or all of the active drivers may be allocated portions. These portions may be defined (by the user or the system) when the driver becomes active and added to the time slice data structure when the interval timer is next triggered. Once a driver is no longer active (e.g. it becomes offline), any portions allocated to the driver are deallocated. The time slice data structure may store a default interval duration that may be used when there is no user-defined interval duration and/or initially before the interval is modified based on detected system conditions (as described above).

Figure 4:
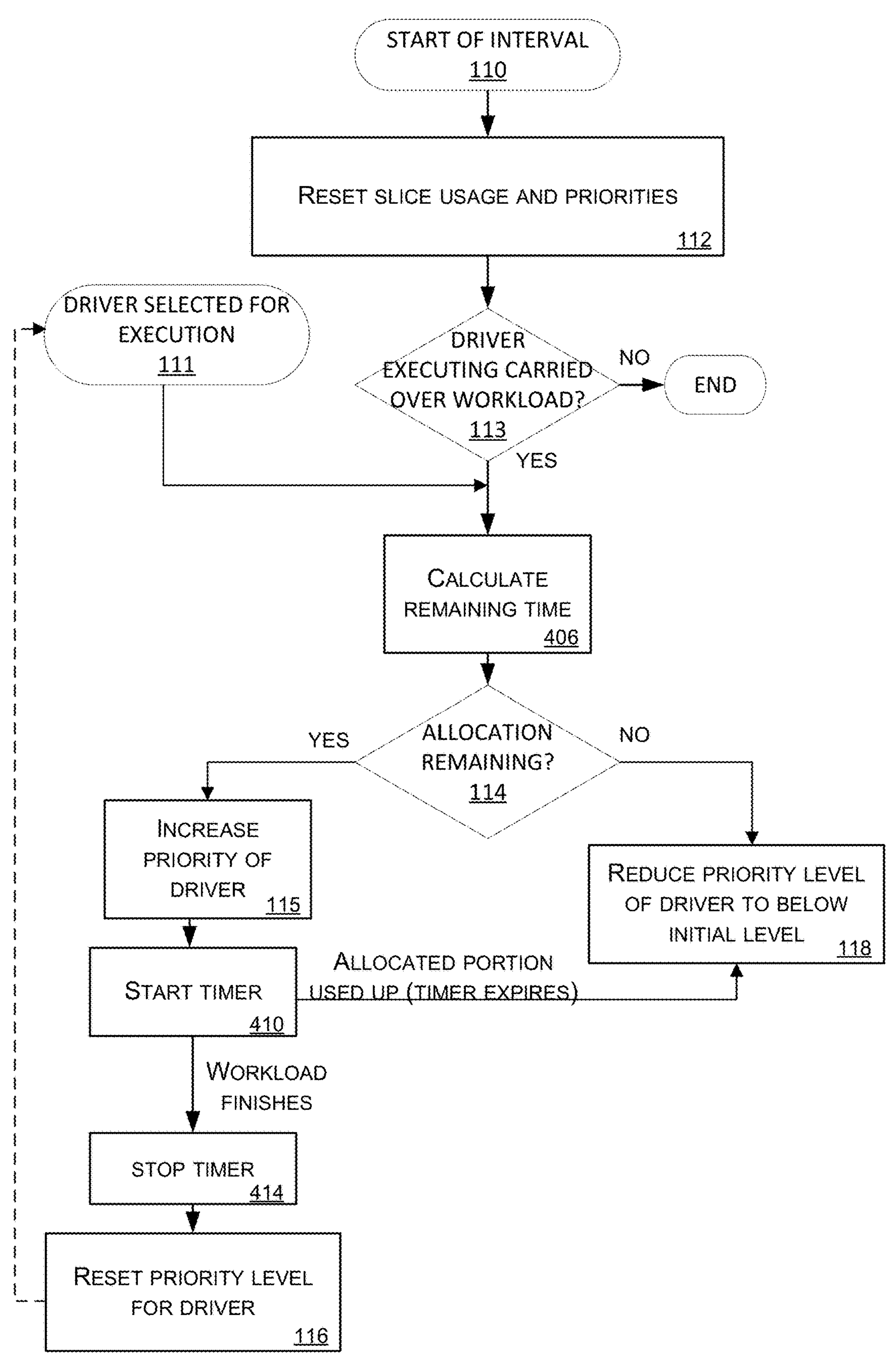
FIG. 4 shows a first example implementation of the execution phase 104 of the method of FIG. 1 in more detail.

FIG. 4 shows an example implementation of the execution phase 104 of the method of FIG. 1 in more detail. Like in the method shown in FIG. 1 and described above, there are two starting points to the method of FIG. 4: at the start of an interval the method starts at block 110 and when a new driver starts subsequently within an interval (e.g. after a context switch or because the previously executing driver finishes its workload), the method of FIG. 4 starts at block 111.

As described above, at the start of an interval (block 110), the slice usage and priorities are reset (in block 112). The slice usage may be stored as part of time slice state information and this may be stored separately from, or as part of, the time slice data structure described above.

When a driver starts executing (in block 111) or where a driver was already executing at the start of the interval ('Yes' in block 113), the remaining time allocation for the driver is calculated (block 406). This may comprise accessing allocation data from the time slice data structure detailed above (i.e. data that defines the portion of the current time interval that has been allocated to the driver that has just started executing) and checking the time slice state information to determine whether any of the allocated portion has already been used. The time slice state information may comprise the cumulative execution time for each active driver that has already executed within the current time interval and as described above, this is reset (in block 112) at the start of each interval. This remaining time allocation (as determined in block 406) is used both to determine whether the driver is executing within its allocation or not (block 114) and to set the slice timer for the driver (block 410) if the driver is executing within its allocation ('Yes' in block 114). In some examples the starting value of the slice timer is a predefined value (e.g. zero) but in other examples, a time stamp may be recorded when the timer starts (in block 410). If the driver is executing within its allocation ('Yes' in block 114), then, as described above, its priority is also increased (in block 115). If the driver is not executing within its allocation ('No' in block 114) then, as described above, its priority is reduced (in block 118) and the driver continues executing since, as described above, once the allocation is used up, the driver can free run (i.e. its execution is independent of the time slicing).

If the slice timer for the driver expires before the driver has finished executing its workload (block 418) then, as described above, the priority of the driver is reduced (block 118) and the driver continues executing until a context switch occurs, the driver completes its workload or the interval timer expires. When the timer expires (in block 418) the time slice state information for the driver may be updated to set the cumulative execution time of the driver in the current interval to a maximum value, which indicates that the driver has used all of its allocation in the current interval.

If the driver finishes its workload before the slice timer expires, then the slice timer is stopped (block 414) and the driver's priority is reset (in block 116) as described above. When the slice timer is stopped (in block 414) a time stamp may be recorded and the difference between this time stamp and any previously recorded first time stamp (from when the driver started executing), or known starting value of the timer, may be used to update the time slice state information for the driver to record the cumulative execution time of the driver in the current interval. In other examples, different methods may be used to determine the execution time of the driver in order that the cumulative execution time of the driver in the current interval can be updated in the time slice state information. As described above, this time slice state information will be used (in block 406) if the driver restarts execution subsequently within the same interval in order to calculate the remaining time allocation for the driver and will be reset (in block 112) at the start of the next interval.

Figure 5:
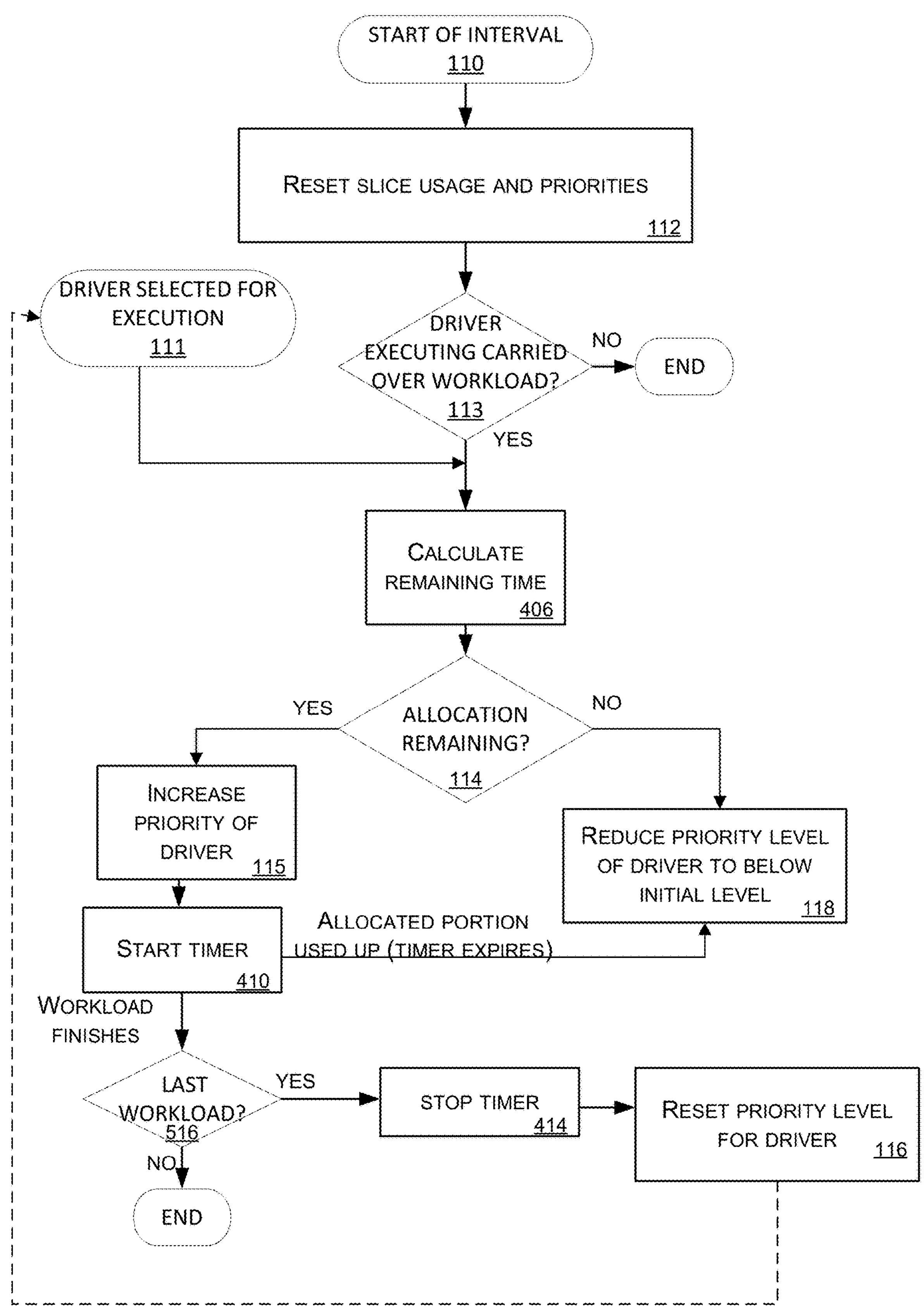
FIG. 5 shows a second example implementation of the execution phase 104 of the method of FIG. 1 in more detail.

An active driver may execute multiple workloads (where these workloads may be generated by different master units) and in such examples, the driver's workload is only finished when the last of the workloads that are being executed finishes. This is shown in FIG. 5 which is a variation of the method shown in FIG. 4 and described above. The method of FIG. 5 only differs from that shown in FIG. 4 in that when a workload finishes, it is determined whether that workload is the last workload for the executing driver (block 516) and only if it is the last workload ('Yes' in block 516) is the timer stopped (in block 414) and the priority level for the driver reset (in block 116). If the workload that completes is not the last workload, no action is taken in relation to the timer and this is reassessed when a next workload finishes.

In order to track when a driver has finished its last workload, a workload counter may be used. This workload counter for a driver may be stored as part of the time slice state information or may be stored elsewhere. Where workload counters are used, these are reset along with the slice usage and priorities at the start of each time interval (in block 112). The slice usage may be stored as part of time slice state information and this may be stored separately from, or as part of, the time slice data structure described above. If a driver is currently executing ('Yes' in block 113), then this means that the workload for the active driver is carried over from one interval to the next and as the workload counter has just been reset (in block 112), the workload counter for that driver is incremented. When a new workload for an active driver is selected for execution, the workload counter for that driver is incremented. Subsequently, when a workload for a driver is completed, the workload counter for that driver is decremented. If this causes the workload counter to transition from a one to a zero, this indicates that the driver has finished executing the last workload ('Yes' in block 516) and the method can proceed to stop the timer for the driver (in block 414) as described above with reference to FIG. 4. If the transition is anything other than a one to a zero then the driver is still executing other workloads ('No' in block 516) and no additional action is taken (as described above).

Figure 6:
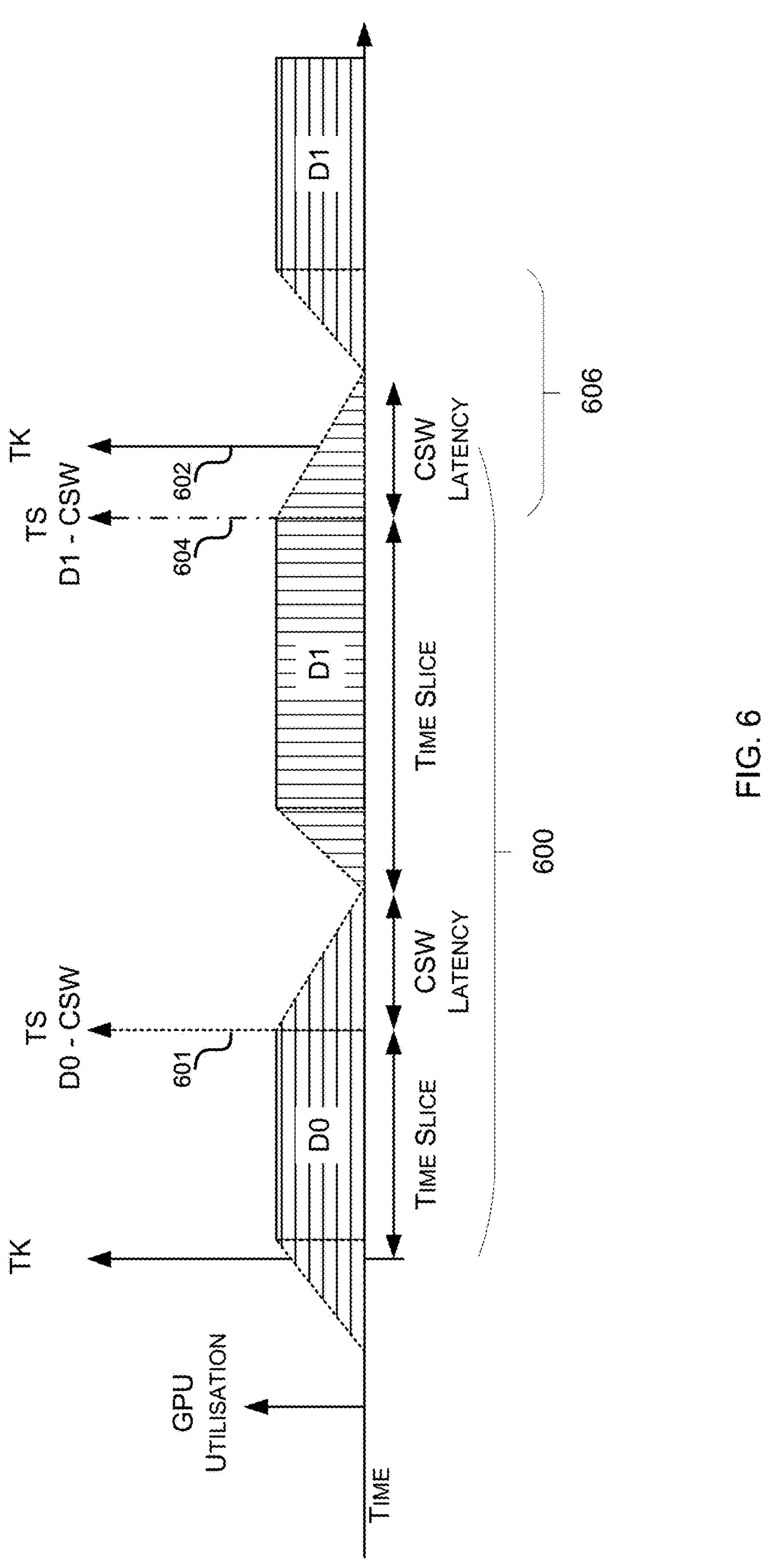
FIG. 6 is a schematic diagram showing a potential effect of context switching latency.

In the methods described above, workloads being executed by a driver at the point that the interval timer expires are carried over into the next interval and the driver will only be context switched out at the start of an interval if the currently executing driver has no allocation in the new interval (resulting in its priority being reduced) and another active driver does have an allocation in the new interval. As described above, context switching on a GPU takes time because of the depth of the GPU pipeline that needs to be drained and so increasing the amount of context switching that is performed increases latency and reduces the efficiency of the GPU. This finite amount of time taken to perform context switching could mean that where a driver is context switched out very close to the end of an interval (such that the context switching has not finished when the interval timer expires) the driver appears to still be executing at the end of the interval, as shown in FIG. 6. FIG. 6 shows an interval 600 in which driver D0 executes and is then context switched out (arrow 601) and driver D1 starts executing. Shortly before the end of the interval (as indicated by arrow 602), driver D1 is context switched out (arrow 604), such that the context switch has not completed before the end of the interval. This would result in the execution of the driver being carried over into the next interval, with its priority being raised immediately into the ceiling range (in block 115), and would result in the driver being context switched back in as soon as the context switch out was complete. This introduces a period of unnecessary context switching (indicated by bracket 606) and reduces the efficiency of the GPU.

Figure 7:
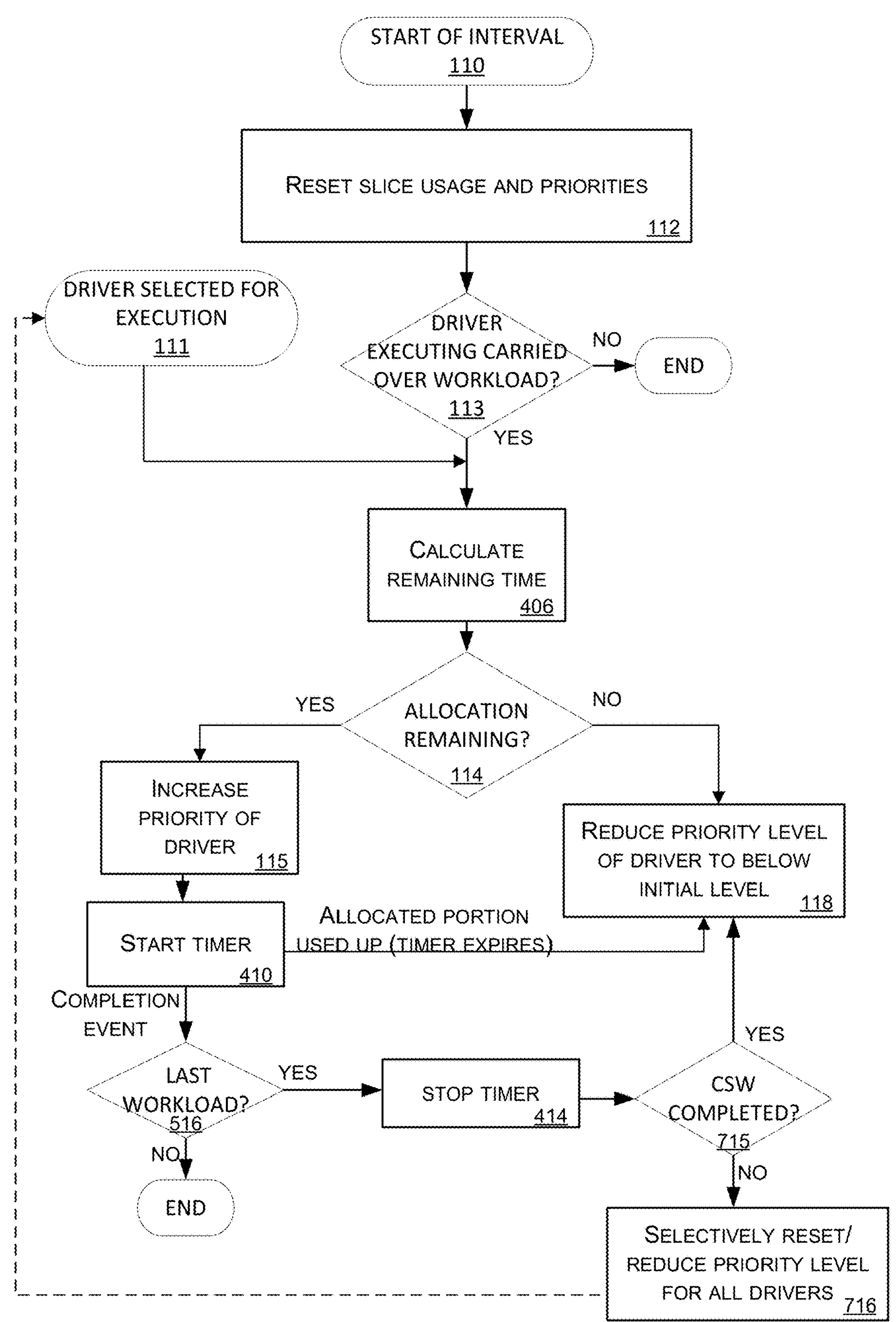
FIG. 7 shows a third example implementation of the execution phase 104 of the method of FIG. 1 in more detail.

In order to address this context switch latency and further improve the efficiency of the scheduling method, the method of FIG. 4 or 5 may be modified as shown in FIG. 7. As shown in FIG. 7, once a driver has started executing within a remaining allocation ('Yes' in block 114) and its priority has been increased (block 115), the timer is started (block 410). At this point there are two possible situations, a completion event or the expiry of the timer. The completion event (in block 412) may be the completion of a context switch (CSW) to switch out the driver (e.g. where this context switch was started before the start of the interval in block 110) or the completion of a workload. If the timer expires, then the priority level of the driver is reduced (in block 118) as described above.

Where a completion event occurs, the method determines whether the completion event (e.g. the context switch or the workload completion) relates to the last workload of the driver (block 516). If the workload that the completion event relates to is not the last workload, no action is taken in relation to the completion event and this is reassessed when a next completion event occurs. If, however, the completion event does relate to the last workload ('Yes' in block 516, i.e. it is the completion of the context switch of the last workload for the driver or the completion of the last workload for the driver), then the timer is stopped (414) and data may be logged/updated as described above.

If the completion event is the completion of a context switch ('Yes' in block 715), the priority of the driver being context switched out is reduced to the floor range (block 118). The priority of the driver will not already be within the floor range because the context switch has occurred across an interval boundary resulting in the priority of the driver being increased into the ceiling range (in block 115) if the driver has an allocation in the new interval (e.g. because it was reset at the start of the interval and then immediately raised because the driver is executing within its new allocation).

If the completion event is not the completion of a context switch for the last workload ('No' in block 715) then the priority levels for each of the active GPU drivers are selectively either reset or reduced (block 716). If a driver has a remaining allocation within the current time interval then the priority of the driver is reset to its initial value (in block 716, in an analogous manner to block 116). If, however, a driver does not have a remaining allocation within the current time interval, the priority of the driver is reduced to the floor range (in block 716, in an analogous manner to block 118).

Whilst FIG. 7 shows the optimisation relating to the delay in completing a context switch being implemented in combination with the method of FIG. 5, it will be appreciated that the optimisation (i.e. blocks 715-716) may also be implemented in the methods of FIG. 4.

By introducing the optimisation shown in FIG. 7, the overall efficiency of the GPU is improved in the event of a context switch occurring very close to the end of an interval, such that the context switching has not completed at the time the interval timer expires. By ensuring that the driver which has just been context switched out has a priority level in the floor range ('Yes' in block 715 followed by block 118) and by delaying the resetting of that priority level until a further completion event occurs (such that the priority is reset in block 716 in a subsequent instance of the method of FIG. 7 triggered by a subsequent completion event), a driver that has just been context switched out cannot be immediately be executed again.

In the examples described above, there is only one driver executing at any one time and there is only one driver with a priority in the ceiling range at any time. In a variation on the methods described above, the drivers may be grouped into isolation groups with an isolation group comprising one or more drivers that can execute at the same time. Isolation is used to prevent OS failures impacting each other. For example, if a guest OS crashes, then another OS can still continue to seamlessly submit jobs to the GPU. Where isolation groups are defined, there is only one isolation group with driver priorities in the ceiling range. Where drivers within the same isolation group execute in parallel, the efficiency of execution of the drivers may be reduced as a consequence of sharing of resources between the executing drivers. Consequently, the methods described above may be modified such that whilst each driver has an individual allocation (from block 108), the allocated portions for all drivers in an isolation group are summed and this total allocation for an isolation group is then used (e.g. in blocks 114 and 406) to determine whether a driver is executing within or outside its allocated portion. For example, given an isolation group comprising three drivers, D0, D1, D2, with respective individual allocations within a time interval of x %, y % and z % of the time interval, each of the three drivers is treated as having an allocation of (x+y+z) %.

The methods described above prevent starvation of workloads by enabling a guaranteed minimum execution time to be allocated to a driver whilst enabling any priority-based scheduling algorithm to be used (e.g. existing priority-based scheduling algorithms may be used without any modification or improved priority-based based scheduling algorithms that are developed in the future may also be used with the methods describes). By adding and/or reducing priority levels by a predefined amount (as described above), the relative ordering of priorities remains (e.g. which enables priority based scheduling even if there are no active drivers with remaining allocations that have workload to execute) and the initial priority level need not be stored. The methods reduce costly context switches by enabling executing drivers to continue to execute across an interval boundary (i.e. from one interval and into the next interval) as long as the driver has an allocation in the next interval. The methods are flexible in terms of their configuration, both in the allocation of time slices and interval length. These may be user-defined and/or system-defined and may be adapted dynamically in response to detected conditions within the GPU (e.g. the detected number of context switches and/or the detected frame rate of a GUI of a driver).

Figure 9:
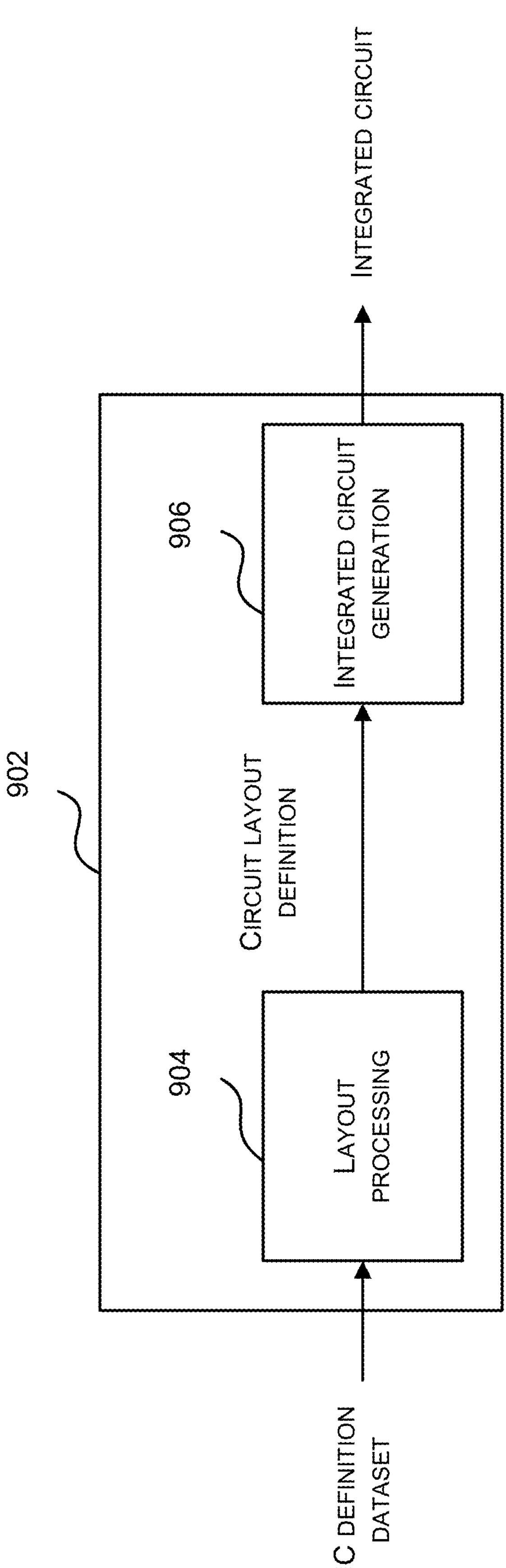
FIG. 9 shows an integrated circuit manufacturing system for generating an integrated circuit embodying a graphics processing system.

The methods described above may be implemented within a GPU, e.g. within a scheduler in a GPU or within logic associated with the scheduler. FIG. 9 shows a computer system 800 in which the graphics processing systems described herein may be implemented. The computer system comprises a CPU 802, a GPU 804, a memory 806, a neural network accelerator (NNA) 808 and other devices 814, such as a display 816, speakers 818 and a camera 822. The drivers execute on the CPU 802. The GPU 804 comprises a microprocessor 810 that may implement the methods described above or the method may be implemented by another entity within the GPU. In the example shown in FIG. 9 the GPU also comprises a store 812 that stores the time slice state information and/or time slice data structure. This store 812 is part of the memory hierarchy within the computer system 800 and in other examples it may be located elsewhere within the GPU (e.g. within the memory 806). The components of the computer system can communicate with each other via a communications bus 820.

Figure 8:
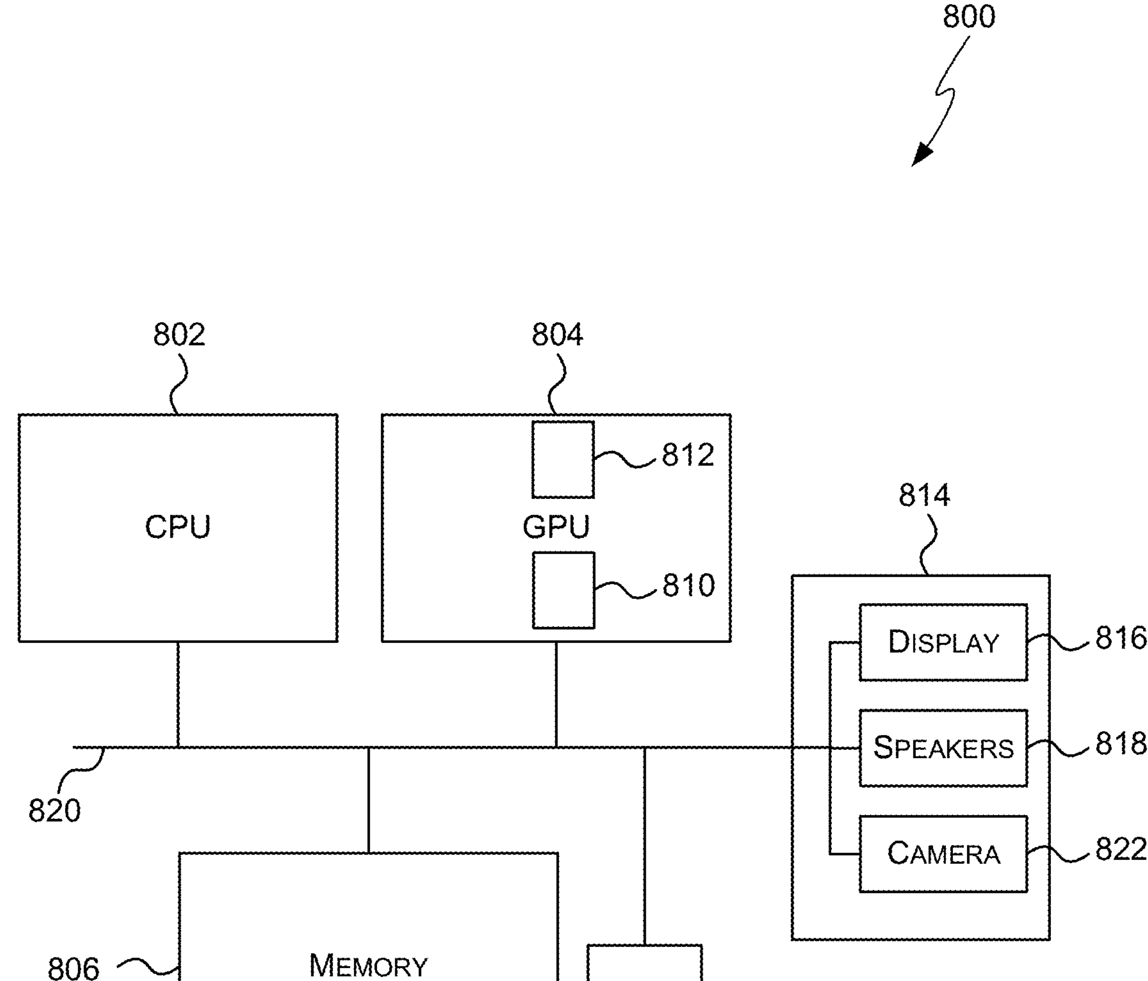
FIG. 8 shows a computer system in which a graphics processing system is implemented.

The GPU of FIG. 8 is shown as comprising a number of functional blocks. This is schematic only and is not intended to define a strict division between different logic elements of such entities. Each functional block may be provided in any suitable manner. It is to be understood that intermediate values described herein as being formed by a scheduler need not be physically generated by the scheduler at any point and may merely represent logical values which conveniently describe the processing performed by the scheduler between its input and output. It will also be appreciated that whilst FIG. 8 shows a particular combination of elements, in other implementations, one or more of the depicted components may be omitted from the system.

The GPUs and schedulers described herein may be embodied in hardware on an integrated circuit. The schedulers described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a GPU configured to perform any of the methods described herein, or to manufacture a GPU comprising any apparatus described herein. An integrated circuit definition dataset may be, for example, an integrated circuit description.

Therefore, there may be provided a method of manufacturing, at an integrated circuit manufacturing system, a GPU as described herein. Furthermore, there may be provided an integrated circuit definition dataset that, when processed in an integrated circuit manufacturing system, causes the method of manufacturing a GPU to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GPU will now be described with respect to FIG. 9.

FIG. 9 shows an example of an integrated circuit (IC) manufacturing system 902 which is configured to manufacture a GPU as described in any of the examples herein. In particular, the IC manufacturing system 902 comprises a layout processing system 904 and an integrated circuit generation system 906. The IC manufacturing system 902 is configured to receive an IC definition dataset (e.g. defining a GPU as described in any of the examples herein), process the IC definition dataset, and generate an IC according to the IC definition dataset (e.g. which embodies a GPU as described in any of the examples herein). The processing of the IC definition dataset configures the IC manufacturing system 902 to manufacture an integrated circuit embodying a GPU as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GPU without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Further aspects of the invention are set out in the following further example.

A first further example provides a method of scheduling a plurality of active GPU drivers in a GPU, each of the active GPU drivers having an initial priority level and the method comprising: for one or more of the plurality of active GPU drivers, allocating a portion of a scheduling interval to the active GPU driver; selecting an active GPU driver for execution according to a priority-based scheduling algorithm; in response to an active GPU driver executing within its allocated portion, increasing the priority level of the active GPU driver; in response to the active GPU driver completing its workload within its allocated portion, resetting the priority level of the active GPU driver; in response to the active GPU driver executing for its whole allocated portion, reducing the priority level of the active GPU driver; and resetting the priority levels of each active GPU driver to their initial priority levels at the start of each scheduling interval.

Increasing the priority level of the active GPU driver may comprise increasing the priority level of the active GPU driver by a first predefined amount and wherein decreasing the priority level of the active GPU driver comprises decreasing the priority level of the active GPU driver by a second predefined amount.

Each priority value may be represented using two's complement and increasing the priority level of the active GPU driver by a first predefined amount may comprise setting a first reserved bit in a value indicating the priority level of the active GPU driver and wherein decreasing the priority level of the active GPU driver by a second predefined amount comprises setting a second reserved bit in the value indicating the priority level of the active GPU driver.

Resetting the priority level of the active GPU driver may comprise clearing the first and second reserved bits in the value indicating the priority level of the active GPU driver.

The method may further comprise: for one or more of the plurality of active GPU drivers, changing the portion of a scheduling interval allocated to the active GPU driver for a next scheduling interval.

The portion of the scheduling interval allocated to the active GPU driver for the next scheduling interval may be changed in response to a first detected system condition.

The first detected system condition may be a reduction in frame rate of the active GPU driver.

The method may further comprise defining an initial length of the scheduling interval (106).

The method may further comprise changing a length of a next scheduling interval.

The length of the next scheduling interval may be changed in response to a second detected system condition.

The second detected system condition may relate to a detected number of context switch events.

The portion of the scheduling interval may be allocated to the active GPU driver according to a user-defined parameter.

The method may further comprise: in response to an active GPU driver starting execution: calculating a remaining part of the allocated portion using slice usage data, the slice usage data indicating a cumulative execution time for the active GPU driver within the scheduling interval; determining whether the active GPU driver is executing within its allocated portion if the remaining part of the allocated portion is positive; and in response to determining that the active GPU driver is executing within its allocated portion, starting a timer for the active GPU driver, and in response to the active GPU driver completing its workload within its allocated portion, stopping the timer for the active GPU driver, and wherein the method further comprises resetting the slice usage data for each active GPU driver at the start of each scheduling interval.

The method may further comprise: in response to the active GPU driver completing a workload within its allocated portion, selectively resetting or reducing the priority level of each other active GPU driver; and in response to the active GPU driver completing a context switch of a workload, reducing the priority level of the active GPU driver.

The method may further comprise: in response to an active GPU driver starting execution: calculating a remaining part of the allocated portion using slice usage data, the slice usage data indicating a cumulative execution time for the active GPU driver within the scheduling interval; determining whether the active GPU driver is executing within its allocated portion if the remaining part of the allocated portion is positive; and in response to determining that the active GPU driver is executing within its allocated portion, starting a timer for the active GPU driver, and in response to the active GPU driver completing a workload within its allocated portion, determining whether the completed workload is a last workload of the active GPU driver; and in response to determining that the completed workload is a last workload of the active GPU driver, stopping the timer for the active GPU driver, and wherein the method further comprises resetting the slice usage data for each active GPU driver at the start of each scheduling interval.

The method may further comprise: in response to the active GPU driver completing a last workload within its allocated portion, selectively resetting or reducing the priority level of each other active GPU driver; and in response to the active GPU driver completing a context switch of a last workload (715), reducing the priority level of the active GPU driver.

The method may further comprise determining that the active GPU driver has executed for its whole allocation portion when an elapsed time since starting the timer for the active GPU driver equals the calculated remaining part of the allocated portion.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of scheduling a plurality of active GPU drivers in a GPU, each of the active GPU drivers having an initial priority level, the method comprising:
- for one or more of the plurality of active GPU drivers, allocating a portion of a scheduling interval to the active GPU driver;
- selecting an active GPU driver for execution according to a priority-based scheduling algorithm;
- in response to an active GPU driver executing within its allocated portion, increasing the priority level of the active GPU driver;
- in response to the active GPU driver completing its workload within its allocated portion, resetting the priority level of the active GPU driver;
- in response to the active GPU driver executing for its whole allocated portion, reducing the priority level of the active GPU driver; and
- resetting the priority levels of each active GPU driver to their initial priority levels at the start of each scheduling interval.

2. The method of claim 1, wherein increasing the priority level of the active GPU driver comprises increasing the priority level of the active GPU driver by a first predefined amount and wherein decreasing the priority level of the active GPU driver comprises decreasing the priority level of the active GPU driver by a second predefined amount.

3. The method of claim 2, wherein each priority value is represented using two's complement and increasing the priority level of the active GPU driver by a first predefined amount comprises setting a first reserved bit in a value indicating the priority level of the active GPU driver and wherein decreasing the priority level of the active GPU driver by a second predefined amount comprises setting a second reserved bit in the value indicating the priority level of the active GPU driver.

4. The method of claim 3, wherein resetting the priority level of the active GPU driver comprises clearing the first and second reserved bits in the value indicating the priority level of the active GPU driver.

5. The method of claim 1, further comprising:
- for one or more of the plurality of active GPU drivers, changing the portion of a scheduling interval allocated to the active GPU driver for a next scheduling interval.

6. The method of claim 5, wherein the portion of the scheduling interval allocated to the active GPU driver for the next scheduling interval is changed in response to a first detected system condition.

7. The method of claim 6, wherein the first detected system condition is a reduction in frame rate of the active GPU driver.

8. The method of claim 1, further comprising defining an initial length of the scheduling interval.

9. The method of claim 1, further comprising changing a length of a next scheduling interval.

10. The method of claim 9, wherein the length of the next scheduling interval is changed in response to a second detected system condition.

11. The method of claim 10, wherein the second detected system condition relates to a detected number of context switch events.

12. The method of claim 1, wherein the portion of the scheduling interval is allocated to the active GPU driver according to a user-defined parameter.

13. The method of claim 1, further comprising:
- in response to an active GPU driver starting execution:
  - calculating a remaining part of the allocated portion using slice usage data, the slice usage data indicating a cumulative execution time for the active GPU driver within the scheduling interval;
  - determining whether the active GPU driver is executing within its allocated portion if the remaining part of the allocated portion is positive; and
  - in response to determining that the active GPU driver is executing within its allocated portion, starting a timer for the active GPU driver, and
- in response to the active GPU driver completing its workload within its allocated portion:
  - stopping the timer for the active GPU driver;
  - wherein the method further comprises resetting the slice usage data for each active GPU driver at the start of each scheduling interval.

14. The method of claim 13, further comprising:
- in response to the active GPU driver completing a workload within its allocated portion, selectively resetting or reducing the priority level of each other active GPU driver; and
- in response to the active GPU driver completing a context switch of a workload, reducing the priority level of the active GPU driver.

15. The method of claim 1, further comprising:
- in response to an active GPU driver starting execution:
  - calculating a remaining part of the allocated portion using slice usage data, the slice usage data indicating a cumulative execution time for the active GPU driver within the scheduling interval;
  - determining whether the active GPU driver is executing within its allocated portion if the remaining part of the allocated portion is positive; and
  - in response to determining that the active GPU driver is executing within its allocated portion, starting a timer for the active GPU driver, and in response to the active GPU driver completing a workload within its allocated portion:

determining whether the completed workload is a last workload of the active GPU driver; and in response to determining that the completed workload is a last workload of the active GPU driver, stopping the timer for the active GPU driver;

wherein the method further comprises resetting the slice usage data for each active GPU driver at the start of each scheduling interval.

16. The method of claim 15, further comprising:

in response to the active GPU driver completing a last workload within its allocated portion, selectively resetting or reducing the priority level of each other active GPU driver; and in response to the active GPU driver completing a context switch of a last workload, reducing the priority level of the active GPU driver.

17. The method according to claim 13, further comprising determining that the active GPU driver has executed for its whole allocation portion when an elapsed time since starting the timer for the active GPU driver equals the calculated remaining part of the allocated portion.

18. A GPU comprising:

a microprocessor configured to schedule a plurality of active GPU drivers in a GPU, each of the active GPU drivers having an initial priority level, by:

for one or more of the plurality of active GPU drivers, allocating a portion of a scheduling interval to the active GPU driver;

selecting an active GPU driver for execution according to a priority-based scheduling algorithm;

in response to an active GPU driver executing within its allocated portion, increasing the priority level of the active GPU driver;

in response to the active GPU driver completing its workload within its allocated portion, resetting the priority level of the active GPU driver;

in response to the active GPU driver executing for its whole allocated portion, reducing the priority level of the active GPU driver; and resetting the priority levels of each active GPU driver to their initial priority levels at the start of each scheduling interval.

19. The GPU of claim 18, wherein the GPU is embodied in hardware on an integrated circuit.

20. A non-transitory computer readable storage medium having stored thereon computer readable code configured to cause a method of scheduling a plurality of active GPU drivers in a GPU to be performed when the code is run, each of the active GPU drivers having an initial priority level, the method comprising:

for one or more of the plurality of active GPU drivers, allocating a portion of a scheduling interval to the active GPU driver;

selecting an active GPU driver for execution according to a priority-based scheduling algorithm;

in response to an active GPU driver executing within its allocated portion, increasing the priority level of the active GPU driver;

in response to the active GPU driver completing its workload within its allocated portion, resetting the priority level of the active GPU driver;

in response to the active GPU driver executing for its whole allocated portion, reducing the priority level of the active GPU driver; and resetting the priority levels of each active GPU driver to their initial priority levels at the start of each scheduling interval.

* * * * *